US012703299B2

(12) United States Patent
Boykin et al.

(10) Patent No.: US 12,703,299 B2
(45) Date of Patent: Aug. 11, 2026

(54) REDUNDANT SAFETY RECOVERY LIGHT SYSTEM

(71) Applicants: Marcus Boykin, Lexington, TN (US); Andre Gist, Jackson, TN (US)

(72) Inventors: Marcus Boykin, Lexington, TN (US); Andre Gist, Jackson, TN (US)

(*) Notice: Subject to any disclaimer, the term of this patent is extended or adjusted under 35 U.S.C. 154(b) by 241 days.

(21) Appl. No.: 17/830,792

(22) Filed: Jun. 2, 2022

(65) Prior Publication Data

US 2023/0391258 A1 Dec. 7, 2023

(51) Int. Cl.

| | |
|---|---|
| ***B60Q 11/00*** | (2006.01) |
| ***B60Q 1/20*** | (2006.01) |
| ***B60Q 1/22*** | (2006.01) |
| ***B60Q 1/32*** | (2006.01) |
| ***B60Q 1/34*** | (2006.01) |
| ***B60Q 1/44*** | (2006.01) |
| ***B60Q 1/46*** | (2006.01) |

(52) U.S. Cl.
CPC .............. *B60Q 11/002* (2013.01); *B60Q 1/20* (2013.01); *B60Q 1/22* (2013.01); *B60Q 1/32* (2013.01); *B60Q 1/34* (2013.01); *B60Q 1/44* (2013.01); *B60Q 1/46* (2013.01)

(58) Field of Classification Search
CPC .................................................... B60Q 11/002
See application file for complete search history.

(56) References Cited

U.S. PATENT DOCUMENTS

| | | | | |
|---|---|---|---|---|
| 1,010,560 | A * | 12/1911 | Wilt | B62D 43/10 296/37.2 |
| 6,118,371 | A | 9/2000 | Haddad et al. | |
| 8,736,173 | B2 | 5/2014 | Nishitani et al. | |
| 9,096,168 | B2 * | 8/2015 | Kuang | H05B 45/395 |
| 9,272,659 | B1 | 3/2016 | Boykin et al. | |
| 9,980,342 | B1 * | 5/2018 | Slade | H05B 45/58 |
| 10,710,560 | B2 * | 7/2020 | Prabhakar | B60T 17/22 |
| 10,952,307 | B1 * | 3/2021 | Recker | H05B 47/11 |
| 11,267,391 | B1 * | 3/2022 | Wu | F21S 45/47 |
| 11,785,692 | B2 * | 10/2023 | Baumgartner | B60Q 1/32 315/77 |
| 11,856,059 | B2 * | 12/2023 | Barile | H04L 67/12 |

(Continued)

FOREIGN PATENT DOCUMENTS

| | | | | |
|---|---|---|---|---|
| CN | 20-2005-0018304 | * | 10/2005 | |
| CN | 112193183 B | * | 9/2020 | |
| JP | 6506885 B2 | * | 4/2019 | F21S 41/14 |

OTHER PUBLICATIONS

Google Machine Translation of CN112193183B (Year: 2020).*
Machine translation of TW202231513A (Year: 2021).*

*Primary Examiner* — Jean Paul Cass

(57) ABSTRACT

A method for providing redundant safety recovery lighting to a motor vehicle which motor vehicle includes an Electronic Control Unit (ECU), the method includes the steps of: a) allowing the ECU to identify a failed external light from a plurality of external lights of the motor vehicle; b) providing a database within the ECU that matches at least some of the plurality of external lights of the motor vehicle with substitute auxiliary external lights that can be activated in place of a failed one of the plurality of external lights; and c) based on a failed external light identified in step a), activating an auxiliary light matched with the failed external light in the databased in step b).

9 Claims, 1 Drawing Sheet

(56) References Cited

U.S. PATENT DOCUMENTS

| | | | | |
|---|---|---|---|---|
| 2006/0020916 | A1* | 1/2006 | Allison | G06F 40/253 |
| | | | | 717/114 |
| 2006/0067299 | A1* | 3/2006 | Caspi | H04W 88/06 |
| | | | | 370/352 |
| 2014/0159577 | A1* | 6/2014 | Manoukis | B60R 16/02 |
| | | | | 315/82 |
| 2016/0018822 | A1* | 1/2016 | Nevdahs | G05D 1/0094 |
| | | | | 701/26 |
| 2017/0259729 | A1* | 9/2017 | Balasundrum | B60Q 1/44 |
| 2022/0058947 | A1* | 2/2022 | Nakagawa | G08G 1/166 |
| 2023/0391258 | A1* | 12/2023 | Boykin | B60Q 1/20 |

* cited by examiner

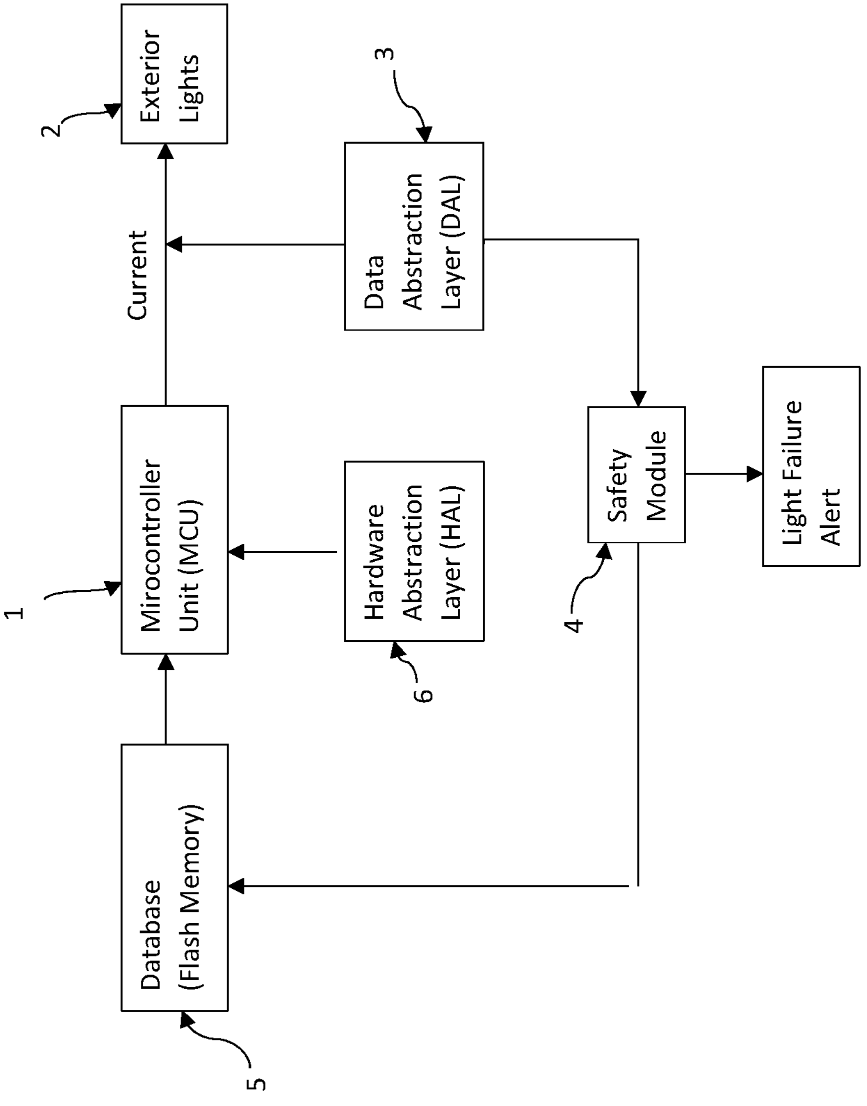
Exterior Lights
2
3
Current
Data Abstraction Layer (DAL)
Mirocontroller Unit (MCU)
1
Hardware Abstraction Layer (HAL)
6
Safety Module
4
Light Failure Alert
Database (Flash Memory)
5

REDUNDANT SAFETY RECOVERY LIGHT SYSTEM

BACKGROUND

The present invention relates generally to lighting control systems for motor vehicles and methods for providing redundant auxiliary lighting when a primary lighting system experiences a failure.

Since the invention of the automobile, lighting has been an important subsystem on all ground vehicles. Automotive lighting is vital to passenger safety.

Lighting systems of motor vehicles include lighting and signaling devices mounted or integrated at the front, rear, sides, and in some cases the top of motor vehicles. The lighting systems of motor vehicles illuminate the roadway ahead for drivers to see and increase the vehicle's visibility, allowing other drivers and pedestrians to see its presence, position, size, and direction of travel, and its driver's intentions.

Bright lights used to illuminate the roadway ahead of a motor vehicle include low-beam and high beam incandescent bulbs or groups of LED elements. Clear backup lights provided on the rear of a motor vehicle allow a driver to see behind a vehicle when backing up. Red brake lights illuminate when a driver steps on a brake pedal and warns other drivers behind a motor vehicle that the driver is slowing down, stopping or has stopped. Tail lights located on the rear of motor vehicles help to visually identify a motor vehicle and its direction of travel at night and in adverse weather conditions when visibility is limited. Amber turn signal lights provided in the front and rear of a motor vehicle illuminate when a driver activates a vehicle's turn signal lever to alert other drivers of a driver's intention to turn the vehicle.

Automotive light bulbs or elements do not have an infinite service life. Some bulbs can last for up to five or six years (traditional, incandescent bulbs). LED elements have a life expectancy of 12 years or more. The amount of voltage being sent through the wiring system of an Electronic Control Unit (ECU) of a motor vehicle can limit the life cycle of automotive bulbs and elements.

When any bulb or element fails while a motor vehicle is being driven there is a safety risk that other drivers will not be alerted if a vehicle is slowing down or stopping or has stopped or if the driver of the vehicle is planning to turn. At night time and in inclement weather other drivers may not even see a motor vehicle in sufficient time to avoid an accident if one or more bulbs or elements have failed.

In older motor vehicles failed or burnt out bulbs were often easily removed and replaced because the fixtures were designed to provide easy access and removal and replacement with plug and turn bulbs. In many newer motor vehicles failed bulbs or elements require removal and replacement at a repair shop or at the dealer's facility. When scheduling an appointment for such removal and replacement of a failed bulb or element requires more than one day's wait, a driver may have no other option than to drive a vehicle with a failed bulb or element, jeopardizing safety.

While the Electronic Control Units (ECU's) on many newer motor vehicles will monitor and provide alerts when a bulb or element fails, the necessary removal and replacement may be delayed depending on when a vehicle owner is able to schedule an appointment at a repair shop.

The present invention provides methods for implementing redundant auxiliary lighting when a primary lighting system experiences a failure, which methods automatically activates an auxiliary light when the ECU of a motor vehicle detects that a bulb or element has failed.

BRIEF SUMMARY

According to various features, characteristics and embodiments of the present invention which will become apparent as the description thereof proceeds, the present invention provides a method for providing redundant safety recovery lighting to a motor vehicle which motor vehicle includes an Electronic Control Unit (ECU), the method comprising the steps of:

a) allowing the ECU to identify a failed external light from a plurality of external lights of the motor vehicle;

b) providing a database within the ECU that matches at least some of the plurality of external lights of the motor vehicle with substitute auxiliary external lights that can be activated in place of a failed one of the plurality of external lights; and c) based on a failed external light identified in step a), activating an auxiliary light matched with the failed external light in the databased in step b).

The auxiliary light matched with the failed external light is activated to mimic a normal manner in which the failed external light is illuminated. In this regard, the auxiliary light matched with the failed external light can be activated to illuminate for in a continuous manner, or off and on in a blinking manner and/or activated to illuminate in a color that matches the color of the failed external light, and/or activated to match the brightness of the failed external light.

The motor vehicle can be an internal combustion automobile, a hybrid automobile, an autonomous automobile, a bus, a truck or truck and trailer combination.

For a truck and trailer combination the ECU can identify a failed external light from a plurality of external lights of the truck and trailer and the matched auxiliary lights can be external lights of the truck and/or trailer.

The database that matches external lights with auxiliary lights can be updated by a wire connection or a wireless connection.

BRIEF DESCRIPTION OF THE DRAWINGS

The present invention will be described with reference to the attached drawing which are given as non-limiting example only, in which:

FIG. 1 is diagram that illustrates the elements of a motor vehicle Electronic Control Unit (ECU) that are used to implement the redundant safety recovery lighting methods of the present invention.

DETAILED DESCRIPTION OF THE DRAWINGS AND THE PRESENTLY PREFERRED EMBODIMENTS

As noted above the present invention provides methods that automatically activate an auxiliary light when the ECU of a motor vehicle detects that a primary light bulb or element has failed.

According to the present invention an auxiliary light is predetermined and paired with each exterior primary light (i.e., incandescent bulbs and/or banks or groups of LED elements and/or high-intensity discharge light bulbs) of a motor vehicle. In the event that a primary light failure is detected by the ECU, the auxiliary light paired with the primary light is activated to mimic the normal function of the failed primary light.

For example, if a turn signal light at the rear of a motor vehicle fails, the present invention can activate an adjacent tail light so that the tail light blinks to signal that the driver is intending to turn the vehicle. Alternatively, an adjacent backup light having one or more LED elements could be activated to illuminate in an amber color and blink to mimic the failed turn signal light.

In another example a backup light having one or more LED elements could be activated according to the present invention to illuminate a red color to replace and mimic a flailed brake light or tail light.

As can be appreciated and understood the present invention allows for activation of various auxiliary lights that are paired with primary lights in manners that illuminate auxiliary lights and/or illuminate the auxiliary lights (LED's) in colors other than their primary functioning colors to mimic their paired primary lights.

The paired auxiliary lights are in most cases are lights that are close in proximity to their paired primary lights.

Primary lights of a motor vehicle that can be paired to auxiliary lights according to the present invention include high and low beam head lights, fog lights, turn signal lights, brake lights, tail lights, back up lights, running lights, peripheral marking lights (on vehicles and trailers), emergency flasher lights, and any other type of exterior light.

Table 1 below provides non-limiting examples of paired external primary lights and auxiliary lights and the type of activation that can be provided to the auxiliary lights according to the present invention. It is to be understood that Table 1 lists non-limiting examples and that other external primary lights can be paired with other auxiliary lights. In addition, the types of activation or activating the auxiliary light can include illuminating the auxiliary lights continuously or in a blinking manner depending on the function of the failed primary light that is to be mimicked by the auxiliary light. Further, in the case of auxiliary LED lights that include banks or groups of LEDs that have multiple diodes of different colors, activation can include changing the color of a bank or group of LEDs in a given light fixture.

TABLE 1

| Primary Light | Paired Auxiliary Light | Type of Activation |
|---|---|---|
| Turn Signal | Tail Light | Tail Light blinks to signal a turn |
| Turn Signal | Backup Light | Backup Light blinks amber to signal a turn |
| Brake Light | Backup Light | Backup Light illuminates red to indicate braking |
| Low Beam Light | High Beam Light | High Beam Light illuminates with lower brightness to mimic Low Beam Light |
| Brake/Stop Light | Marker/Tail Light | Marker/Tail Light illuminates brighter red to indicate stopping |

The present inventive methods are implemented through an Electronic Control Unit (ECU) of the type that is currently used in motor vehicles. In motor vehicles the ECU is responsible for power distribution so as to enable the ECU to control functions such as automotive lighting, door, windows, security access etc. The Hardware Abstraction Layer (HAL) of an ECU allows for control of various hardware devices via the Microcontroller Unit (MCU) including exterior lighting devices. The ECU includes a Data Abstraction Layer (DAL) that monitors the current applied by the MCU to various applications including exterior lighting devices. A Safety Module in the ECU can, based on lighting current monitored by the DAL, provide an alert display to warn a driver when an exterior light has burnt out or has otherwise failed.

According to the present invention when a failed lighting current to a primary light is detected by the DAL the Safety Module in an ECU causes the ECU to apply power to a preselected auxiliary light through a database of paired primary and auxiliary lights that is programmed into a flash memory of the MCU.

FIG. 1 is diagram that illustrates the elements of a motor vehicle Electronic Control Unit (ECU) that are used to implement the redundant safety recovery lighting methods of the present invention.

It is to be understood that FIG. 1 shows the basic functional and hardware elements of a conventional ECU that are used to implement the redundant safety recovery lighting methods of the present invention and that conventionally motor vehicle ECUs include functional and hardware elements that control one or more of the electrical systems or subsystems in a motor vehicle, such as engine, power steering control, power windows, seats, HVAC, door locks, keyless entries, airbags, automatic emergency braking and other systems.

The redundant safety recovery lighting methods of the present invention can be implemented in any motor vehicle ECU that includes the basic functional and hardware elements discussed below in reference to FIG. 1 or equivalent elements known to those skilled in the art.

In reference to FIG. 1, Microcontroller Unit (MCU) 1 of the ECU which processes inputs from various sensors throughout a motor vehicle and activates outputs to various devices and systems as required, outputs electrical current to the external lights 2 of the motor vehicle, including light bulbs and/or LEDs.

The Data Abstraction Layer (DAL) 3 monitors the electrical current applied by the MCU to various devices and systems, including to the external lights. In the event of a failed external light, the DAL 3 activates Safety Module 4 which can display an alert that identifies the flailed light in a conventional manner.

According to the present invention at the same time the DAL 3 activates the Safety Module 4 the signal identifying the failed light is sent to Database 5 in the MCU 1 which includes a list of paired primary lights and auxiliary lights so that the identification of the appropriate auxiliary light is identified in MCU 1, which under the control of the Hardware Abstraction Layer (HAL) 6, outputs an appropriate electrical current to the auxiliary light to activate the auxiliary light as a replacement for the paired failed primary light.

The output current electrical current applied to an auxiliary light according to the present invention can be adjusted to cause the auxiliary light to illuminate in a continuous manner or to blink and/or to have a reduced or increased brightness so as to mimic the paired flailed primary light. As discussed above, in the case of LED lights, the auxiliary light can illuminate in a color that mimics the failed primary light. The manner of adjusting the electrical output to an auxiliary light effect the different types of activation is well known and within the capabilities of an ECU.

The manner in which a failed primary light is detected by a motor vehicle ECU is well known and can involve the combination of determining that current to a flailed primary light is available but not flowing to the failed primary light.

The redundant safety recovery lighting methods of the present invention can be applied to all types of motor vehicles, including automobiles (internal combustion, hybrid and electrical), autonomous vehicles, school buses, commercial buses, commuter buses, shuttle buses, trucks (with and without trailers), trailer running lights, emergency vehicles, construction vehicles, motorcycles, and any other type of motor vehicle that includes an ECU.

The database of paired primary and auxiliary lights that is programmed into the flash memory of the MCU can be updated by a direct connection to the ECU or a remote wireless connection.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above and set forth in the attached claims.

The invention claimed is:

1. A method for providing redundant safety recovery lighting to a motor vehicle which the motor vehicle is an autonomous automobile that includes an Electronic Control Unit (ECU), the method comprising the steps of:

a) allowing the ECU to identify a failed external light from a plurality of external lights of the motor vehicle, the plurality of external light of the motor vehicle comprising high and low beam head lights, fog lights, turn signal lights, brake lights, tail lights, back up lights, running lights, peripheral marking lights and emergency flasher lights;

b) providing a database within the ECU that matches at least some of the plurality of external lights of the motor vehicle with substitute auxiliary external lights that can be activated in place of a failed one of the plurality of external lights; and c) based on a failed external light identified in step a), activating an auxiliary light matched with the failed external light in the databased in step b) wherein the high beam head light mimics a failed low beam head light, wherein the failed external light is activated to mimic a normal manner in which the failed external light is illuminated, and wherein the auxiliary light matched with the failed external light is activated to illuminate in a color that matches the color of the failed external light.

2. The method for providing redundant safety recovery lighting to a motor vehicle which motor vehicle according to claim 1, wherein in step c) the auxiliary light matched with the failed external light is activated to illuminate for in a continuous manner.

3. The method for providing redundant safety recovery lighting to a motor vehicle which motor vehicle according to claim 1, wherein in step c) the auxiliary light matched with the failed external light is activated to illuminate off and on in a blinking manner.

4. The method for providing redundant safety recovery lighting to a motor vehicle which motor vehicle according to claim 1, wherein in step c) the auxiliary light matched with the failed external light is activated to match the brightness of the failed external light.

5. The method for providing redundant safety recovery lighting to a motor vehicle which motor vehicle according to claim 1, wherein the automobile is a hybrid automobile.

6. The method for providing redundant safety recovery lighting to a motor vehicle which motor vehicle according to claim 1, wherein the motor vehicle is a bus.

7. The method for providing redundant safety recovery lighting to a motor vehicle which motor vehicle according to claim 1, wherein the motor vehicle is a truck.

8. The method for providing redundant safety recovery lighting to a motor vehicle which motor vehicle according to claim 1, wherein the motor vehicle is a truck and trailer combination and in step a) the ECU identifies a failed external light from a plurality of external lights of the truck and trailer.

9. The method for providing redundant safety recovery lighting to a motor vehicle which motor vehicle according to claim 1, wherein the database in step b) can be updated by a wire connection or a wireless connection.

* * * * *